Patented Dec. 15, 1942

2,305,478

UNITED STATES PATENT OFFICE 2,305,478

METHOD OF CARBONIZING ELECTRODES

Emerson W. Kern, New York, N. Y., assignor to Bell Telephone Laboratories, Incorporated, New York, N. Y., a corporation of New York No Drawing. Application August 2, 1940,
Serial No. 350,155

5 Claims. (Cl. 148—13.1)

This invention relates to methods of carbonizing electrodes for electronic discharge devices and more particularly to coating processes for metallic electrode surfaces, such as anodes, in high power devices.

In the operation of electronic discharge devices of the power rectifier or amplifier type, particularly involving an oxide coated emitter, the high heating energy dissipated in the anode results in temperature conditions which emancipate deleterious gases and impurities of the metal which attack and poison the emitting coating of the cathode. A particularly obnoxious source of trouble is sulphurous compounds evolved from nickel which poison the active emitting coating of the cathode and materially terminates the useful life long prior to the ultimate probability of operating performance of the device. Efforts to alleviate the high temperature of metallic anodes operating under these conditions, such as coating the anode with carbon, to facilitate the dissipation of heat therefrom, appear to increase the sulphur content of the anode due to cumulative action during the carbonizing process.

An object of this invention is to eliminate deleterious products from the metallic electrode in order to avoid poisoning of the emitting cathode.

Another object of the invention is to attain a high thermal emissivity or black body constant for the electrode in order to permit more power to be employed with the device.

A further object of the invention is to facilitate the carbonization of a metallic electrode with a minimum or substantially no loose surface carbon.

In accordance with the general aspects of this invention, the elimination of deleterious products and the subsequent carbonizing of the metallic electrode is realized by a treatment of the electrode in successive and alternate reducing and oxidizing atmospheres for stated time intervals with a final carbonizing procedure in a hydrocarbon atmosphere.

In a specific aspect of the invention, the metallic electrode, preferably nickel, is treated in a hydrogen atmosphere at temperatures from 400 to 800° centigrade to remove surface impurities by reduction. The reduced metal is oxidized in oxygen or a combination of oxygen and nitrogen at temperatures from 800 to 1000° centigrade to combine with constituents of the metal. A further reducing treatment in hydrogen at the same temperature of the prior treatment decomposes the oxide coating and the combined products of formed reaction. A subsequent oxidizing treatment similar to the first oxide coating is performed at a lower temperature of 800° centigrade and this is followed by the carbonizing process in a hydrocarbon atmosphere, such as propane gas, at 800° centigrade. The reducing and oxidizing steps may be carried further, prior to the carbonizing, to increase the depth of carbon penetration in the nickel surface. This treatment eliminates deleterious products from the nickel, particularly sulphur and sulphur compounds, and insures a homogeneous and highly thermal emissive carbon coating on the nickel electrode to prolong the operating life and to attain a high power rating for the device.

Other objects and advantages of this invention will be more clearly understood from the following detailed description of the various aspects of this invention.

In the investigations of the subject-matter of this invention, several variables were found to affect the quality and appearance of the carbonized deposit on a metallic nickel electrode. These variables are: kind of nickel, its initial surface state, the method of homogenizing the surface, the degree of oxidation of the nickel and the time, temperature and concentration relationship of the hydrocarbon gas during carbonizing. As a result of these investigations, the following procedure was found to produce a satisfactory carbon deposit on nickel and it is suitable for large scale operation. The nickel is reduced in a hydrogen atmosphere at 700 to 800° centigrade for five minutes. Oxidation of the reduced nickel is then performed at 1000° centigrade for ten minutes, the composition of the oxidizing gas being approximately 25 per cent oxygen and 75 per cent nitrogen. This proportion is desired for controlling the degree of oxidation of the nickel under the time and temperature conditions indicated. The next step involves the reduction of the oxidized nickel in the hydrogen atmosphere at 700 to 800° centigrade for five minutes and the nickel is subsequently oxidized in the mixture of oxygen and nitrogen at 800° centigrade for ten minutes. This treatment removes a large percentage of the sulphur compounds and other injurious components of the nickel. The processed nickel is then ready for the carbonizing treatment which is performed at 800° centigrade for three to five minutes employing a hydrocarbon gas, such as propane. In order to control the carbonizing coating it is preferable to mix the propane gas with nitrogen or other diluent gas in the proportions of approximately 20 per cent propane gas to 80 per cent nitrogen.

When this procedure is followed, a carbon deposit is obtained which is of uniform black appearance. With grade A nickel, the surface is of matte black color having a very small amount of loosely adherent carbon, which, if necessary, may be removed by wiping or brushing. With Mond nickel, the carbonized surface is of gun-metal appearance having practically no loosely adherent carbon. In both cases the deposit has an abrasion resistance twice that of a commercial carbonized coating, although the carbonizing process is more rapid and produces only negligible quantities of excess loosely adherent carbon on the nickel. The recommended procedure may be modified by conducting both oxidations at 800° centigrade or again only one oxidation at 800° centigrade may be used if the nickel gives a sufficiently uniform coating with one oxidation cycle. In either modification the quantity of carbon deposited is reduced.

Briefly, the carbonizing process appears to depend on the following mechanism. The initial treatment with hydrogen removes surface oxides and other impurities on the surface of the metal. On oxidation, oxygen combines with the metal atom and the depth of penetration is dependent primarily on the time-temperature relationship. Either hydrogen reduction or treatment with propane reduces this oxide. With propane, the reduction of the oxide is accompanied by thermal decomposition of the gas, which as its end product forms carbon which is deposited on the reduced nickel. The depth of penetration of this carbon deposit is a function of the depth and configuration of the oxide layer. Inasmuch as the nature of the carbon deposit is so dependent on the character of the surface structure of the nickel, a discussion of the chemistry of oxidation, reduction and carbonizing is warranted.

*Oxidation of nickel.*—The quantity, rate of formation, and physical and chemical properties of nickel oxide are dependent on the temperature of formation. The formation of nickel oxide in air takes place at a temperature as low as 270° centigrade, however at a very slow rate. For complete oxidation, a temperature of 400° centigrade is necessary. At temperatures of 400 to 500° centigrade the color of the oxide is black to gray and as higher temperatures are approached the oxide takes on more of a greenish hue. The specific gravity of the oxide increases rapidly with the temperature of formation up to 800° centigrade, after which the rate of increase in density with temperature rapidly diminishes. The electrical resistance of the oxide shows a similar inflection point at this temperature. The chemical properties of nickel oxide are likewise dependent upon its temperature of preparation. When different temperature oxides are treated with a solution of sulphuric acid, the amount dissolved under similar conditions varies as the temperature of preparation of the oxide, the rate of solution of the 800 to 900° centigrade oxide being only about 2 per cent of that of the oxide formed between 700 and 800° centigrade. The rate of formation of the oxide increases as the temperature rises. One can safely work at temperatures as high as 1000° centigrade or more in forming the oxide, since its dissociation pressure at these temperatures is low.

*Nickel-oxide reduction.*—Hydrogen reacts with nickel oxide to form water in accordance with the formula $$NiO + H_2 \rightarrow Ni + H_2O$$

The equilibrium at increasingly high temperatures becomes unfavorable for the reduction of nickel oxide by hydrogen because the ratio of water to hydrogen at 700° centigrade is 195 and becomes at 900° centigrade 140. It is seen that increases in temperature are unfavorable to the equilibrium for the reduction of nickel oxide by hydrogen but at high temperatures the equilibrium is sufficiently in favor of the reduction so that the increase in rate due to high temperature may still be taken advantage of.

*Carbon film formation.*—The deposition of the carbon film is associated with a reaction involving nickel oxide. The question, therefore, naturally arises as to a possible stoichiometric relation between the oxygen originally present and the carbon deposited. If such a relation were found to exist, it would strongly indicate some form of chemical combination between the carbon and nickel. If, however, no such relation were found, the mechanism would involve a physical deposition of carbon as one factor. Accordingly, weighed samples of nickel were oxidized, reweighed to find the oxygen gain and then carbonized, after which they were again weighed. By this means the relative quantities of oxygen and carbon associated were measured and also the weight of carbon per unit area of surface could be calculated. The values so found are tabulated in Table No. 1.

TABLE No. 1

*Stoichiometric relation between oxygen and carbon in nickel carbonization*

| Treatment | Oxygen | Carbon | Abrasion | Oxygen | Carbon |
|---|---|---|---|---|---|
| 800° C. 25% O$_2$ 20% Pr. | (Gr./cm.$^2$) $\times 10^{-4}$ | (Gr./cm.$^2$) $\times 10^{-4}$ | Grs. | Gr.equiv. cm.$^2 \times 10^{-8}$ | Gr.equiv. cm.$^2 \times 10^{-8}$ |
| *Mond* | | | | | |
| R—O | 2.38 | 2.68 | | 1.5 | 2.2 |
| R—O | 3.62 | 2.84 | 4.0 | 2.2 | 2.3 |
| R—O—R—O | 1.56 | 3.46 | 4.7 | 1.0 | 2.9 |
| R—O—R—O—R—O | 2.77 | 7.26 | 5.5 | 1.7 | 6.0 |
| *Grade A* | | | | | |
| R—O | 2.36 | 9.88 | 6.0 | 1.5 | 8.2 |

R=reduced  O=oxidized

For each oxygen atom in the first oxide formed there is between one and two carbon atoms deposited. For subsequent oxidation cycles, the ratio of carbon to oxygen atom increases to around three. This fact precludes the stoichiometric interchange alone between the oxygen and carbon. In the case of grade A nickel, the ratio of carbon to oxygen increases to the value of 5.5.

By calculations of density value there are about $10^{-8}$ gram atoms of nickel exposed per square centimeter of smooth surface. The amount of carbon and oxygen deposited per square centimeter of surface is of the order of $10^{-5}$ grammols per square centimeter. This consideration with the fact that the one atom of oxygen is associated with one nickel atom and the carbon is associated with the oxygen would indicate that the carbon extends to a depth of at least 1000 atom diameters of nickel. The coating consists of a physical deposit of extremely finely divided carbon on nickel accompanied to a limited extent by solution of carbon in nickel. The solubility of carbon in nickel is not definitely known at 800° centigrade and lower temperatures but is less than 0.50 per cent. It is of interest to examine the possible mechanism through which the carbon may be deposited. Hydrocarbon gases when heated are known to undergo decomposition, and subsequently decomposition products may react to form polymerization products. The decomposition products resulting from heating propane are the formation of an equilibrium mixture of hydrogen and propylene and a slower reaction forming ethylene and methane from an unstable intermediate of propane and propylene. However, when carbonizing experiments were conducted with the nickel-oxide surface at 800° centigrade with both ethylene and methane, a suitable carbon film was obtained from ethylene but not from methane. At high concentration, ethylene did not behave like propane. This indicates that in the proposed process the unsaturated compounds are very likely the active ones in the propane gas treatment. The effective carbonizing temperature of propane gas, namely, 800° centigrade, is in the temperature region where the higher concentration of unsaturated compounds are produced by breakdown of hydrocarbons principally in the production of propylene from propane, the former which is presumably the active gas in the carbonizing treatment.

In this investigation two principal types of carbon surfaces have been produced, namely, a matte carbon black surface and a gun-metal surface. Each of these two types may be in a glossy or dull surface. The most desirable surface for use as a highly efficient heat radiator depends on the particular application in which it is employed. The effectiveness of an anode as a heat radiator in an electron discharge device is proportional to its total emissivity which is equal to 1 minus the reflectivity. The reflection refers to radiation of the same quality, i. e., the same color temperature as the light emitted by the body when it is used at a high temperature. The radiation takes place in the infra-red. The relative effectiveness as radiators in this region of several blackened nickel samples will be of the same order as their absorption in the visible red if the emissivity of carbon remains constant as the wave-length increases.

For an evaluation of black bodies as radiators, a value of total emissivity is a sound basis but such values are not directly attainable from the literature for carbonized surfaces at low temperatures so the best estimate of total emissivity is gained through other data with the aid of the properties of an ideal black body. The loss of energy by radiation takes place in such a manner that there is a wave-length of maximum energy loss. A change in the magnitude of this wave-length of maximum energy loss produces a corresponding change in the loss at other wave-lengths in the case of a black body so that the total emission is made up of a band of radiations which follows the wave-length of maximum emissivity. For comparison of radiators one can examine them for absorption at the wave-length of maximum radiation for a black body with the temperature under consideration and as an approximation consider that they stand as radiators in the order of their absorption at this point. For a body having the best radiation qualities, for example, a black body, the wave-length of maximum radiation is given by Wiens law $\lambda_m T = 2.919$. In Table No. 2 are shown the wave-lengths at which the maximum radiation occurs from a black body as calculated from Wiens law and the estimated approximate value for the wave-length of maximum intensity of radiation from a blackened strip of metal. It is seen that the wave-length of maximum radiation follows fairly closely that for a black body.

TABLE No. 2

| °C. | Wave-length for maximum emission | | |
|---|---|---|---|
| | °K. | Black body | Blackened metal |
| | | $\mu$ | $\mu$ (approx.) |
| 1000 | 1377 | | 2.0 |
| | 1273 | 2.28 | |
| | 1087 | | 3.0 |
| 800 | 1073 | 2.7 | |
| | 836 | | 3.5 |
| 600 | 873 | 3.3 | |
| 400 | 673 | 4.3 | |
| 200 | 473 | 6.1 | |

The above table indicates that in a temperature range from 200° centigrade to 600° centigrade, the band of radiation centers about the region $3\mu$ to $6\mu$ for the maximum.

The relative merits of the several surfaces described above should be indicated by their absorption at room temperatures in the visible range at $0.650\mu$. In Table No. 3 are shown absorption values for the several types of surfaces produced in accordance with this invention. The maximum difference in per cent absorption is about 10 per cent of the best absorber; and dropping the emissivity from 1.0 to 0.9 would result in a temperature differential of 27.3° in the neighborhood of 700° centigrade. Since the surfaces in all cases are composed largely of carbon, differences noted are probably due to surface configurations.

TABLE No. 3

*Emissivity of carbonized nickel*

| Surface | Per cent reflection (100%=MgCO$_3$) | Monochromatic emissivity ($0.650\mu$ 25° centigrade) |
|---|---|---|
| Carbon—matte | 3.3 | .97 |
| Carbon—glossy | 4.3 | .96 |
| Gun-metal—dull | 9.6 | .92 |
| Gun-metal—shiny | 15.4 | .87 |

For comparison with these values, the following values of total emissivity from 500 to 800° centigrade for polished nickel is 0.25 and for blackened nickel is 0.85. It is thus seen that the monochromatic emissivity is of the same order as the total emissivity.

In proceeding with the various steps of this invention to free the metal of deleterious matter and provide an efficient heat radiating surface for high power dissipation, a heating oven or furnace is employed for treating the metal and is formed, for example, of an insulating material, such as "sillimanite," preferably of tubular form, and having a central heating zone flanked by end cooling zones, the zones being of such diameter as to accommodate the configuration of the particular electrodes to be processed. This oven is provided with an external electrical winding or resistance heater to insure the proper temperature gradients for the different operations since this type of oven may be employed indiscriminately for the reduction, oxidation and carbonization treatments for the electrode.

Prior to processing of the electrode, the heating zone of the furnace is raised to a temperature between 700 and 800° centigrade and one or more electrodes are deposited in a suitable conveyor tray which may be advanced into the heating zone. A supply of hydrogen gas is injected into the furnace for a period from 3 to 10 minutes. The hydrogen tends to reduce the nickel-oxide film and other surface contaminating substances thereon rapidly above 360° centigrade or higher so that hydrogen pretreatment above 360° centigrade and at temperatures no higher than that used for oxide formation effects a speedy reduction. It was found that when the temperature of hydrogen reduction is higher than that used during carbonizing (800° centigrade) the carbon films produced are not as uniform in appearance, because the carbon tends to be deposited in the form of very minute islands. After this pretreatment the anodes are withdrawn to a cooling zone and the furnace is flushed with nitrogen to remove hydrogen contaminating products of reduction. Returning the anodes to the heating zone the temperature of the furnace may be from 700 to 1000° centigrade depending on the character of the ultimate carbon surface desired on the electrodes therein. When a suitable temperature is attained, an oxidizing atmosphere is injected into the furnace, preferably in the concentration of 25 per cent oxygen and 75 per cent nitrogen to control the degree of oxidation and insure a uniform and high quality coating on the metal. In the case of nickel electrodes, the coating will be nickel oxide. The oxidizing time may be from 2 to 30 minutes. The particular oxygen concentration specified has been found to produce higher abrasion values on the resultant carbon layer than other concentrations although greater quantities of the oxide may be produced with higher concentration or longer periods of treatment. From a consideration of the rate of oxide formation, it is known that the weight of the oxide increases with increased time of oxidation. However, the abrasion value of the final carbon film increases only slightly with increasing time of oxidation after 10 minutes. The removal of the electrodes to the cooling zone permits the furnace to be prepared for the subsequent step of reduction. In this treatment the furnace is maintained at a temperature commensurate with the first reduction step, namely 400 to 800° centigrade, and the electrodes are returned to the heating zone while a supply of hydrogen gas is flowed through the furnace for a duration of approximately 5 minutes to decompose the oxide and the impurities in the nickel associated with the coating. Such impurities, principally sulphur compounds, being drawn out of the nickel by the combined action of the nickel oxide and the reducing atmosphere. After flushing the furnace the temperature is again raised to the oxidizing temperature, namely, 700 to 1000° centigrade, to reoxidize the nickel anode for a period of at least 10 minutes, the oxidizing atmosphere being the same as previously described in the first oxidizing treatment. However, the second oxidizing treatment may be performed at a lower temperature than the first treatment, for example, 1000° centigrade for the first oxidizing and 800° centigrade for the second treatment.

A further reduction and oxidizing treatment may be applied to the electrodes in accordance with the steps previously described in order to thoroughly process the nickel and prepare it for the subsequent carbonization treatment.

*Carbonizing treatment.*—In this step of the process, the electrodes in the heating zone of the furnace are heated to a temperature of 700 to 800° centigrade and a hydrocarbon gas, such as propane, is injected into the furnace. A controlled mixture is preferred, such as 20 per cent propane and 80 per cent nitrogen, although the concentration of propane may vary from 4 to 80 per cent with the balance being nitrogen, hydrogen or other diluent gas. The time of carbonization may be within the range of from 2 to 10 minutes and the rate of flow of the gas through the furnace, when it is of the type described above with a diameter of one inch or so, should be between 125 to 1000 cubic centimeters per minute. A preferred flow is 500 cubic centimeters per minute since this gives a condition of gas temperature similar to the wall temperature of the furnace described above. A uniform coating of carbon is secured when the temperature of the furnace during the carbonizing treatment is maintained no higher than the oxidizing temperature.

When carbonizing at 800° centigrade for 4 minutes in a 20 per cent propane and 80 per cent nitrogen atmosphere, the character of the carbon deposit on the 910° centigrade oxide is of the gun-metal type. With the 800° centigrade oxide, the carbon film is the characteristic carbon matte black. The 750° centigrade and 650° centigrade oxide likewise produced matte black surfaces but the deposit appears to become lighter in weight as the temperature of oxidation is reduced.

*Optimum oxidation and carbonizing temperatures.*—A series of oxides were prepared using temperatures in four steps ranging between 700° centigrade to 1000° centigrade. Each of these oxides was then carbonized at three different temperatures, namely, 710° centigrade, 805° centigrade and 900° centigrade. The upper temperature was held to 900° centigrade since it had been previously found that with a carbonizing temperature of 1000° centigrade, the only oxide which gave an adherent carbon film was the 1000° centigrade oxide. This carbon deposit was of the gun-metal type. In these treatments the oxidizing time was fixed at 10 minutes using a 25 per cent oxygen in nitrogen mixture, and the oxidized specimens were carbonized for 4 minutes in 20 per cent propane in nitrogen mixture. Table No. 4 shows the abrasion values for these specimens.

TABLE No. 4

*Abrasion values of carbonized specimens*

| Temperature of oxide formation | Temperature of carbonizing | | |
| --- | --- | --- | --- |
| | 710° C. | 805° C. | 900° C. |
| 700° C | 4.5 | 8.0 | 4.0 |
| 775° C | 9.0 | 6.0 | 4.5 |
| 850° C | 6.0 | 8.0 | 6.5 |
| 1000° C | 5.0 | 5.0 | 4.5 |

From a consideration of the abrasion values, a carbonizing temperature of 800° centigrade is best and this temperature coincides with the temperature arrived at from the standpoint of appearance. The oxide formed at 850° centigrade is best from an abrasion standpoint but the appearance of the carbon from this oxide is less satisfactory than that from the 775° centigrade oxide.

In the carbonizing treatment, the hydrocarbon gas mixture undergoes decomposition in rapid and slow reactions, which occur in the heating zone of the furnace and also the decomposition products may combine to form polymers. The products of decomposition of the original gas mixture include hydrogen, propylene, ethane, ethylene and methane with polymers of the unsaturated compounds which mixture forms the active coating media for deposition of carbon on the electrodes. These gases produce at the temperature of film formation a reducing action on the nickel oxide and in this action free carbon is formed with unsaturated compounds of the propane mixture, principally propylene, being active in the process. The initial carbon atoms so formed are dissolved in the nickel and subsequent atoms are bonded to the soluble carbon film to build up a uniform and adherent matrix of carbon on the nickel surface. In addition, adherence of the carbon film is also produced by the oxidation-reduction procedures which transform the original smooth nickel surface to a spongy condition. This spongy state permits mechanical interlocking of the deposited carbon and the substratum.

In a specific procedure in accordance with this invention, the nickel electrode is reduced in hydrogen at 700 to 800° centigrade for 5 minutes, then oxidized at 1000° centigrade for 10 minutes, the oxidizing gas being approximately 25 per cent oxygen and 75 per cent nitrogen. The oxidized nickel electrode is then reduced in hydrogen at 700 to 800° centigrade for 5 minutes and again oxidized at 800° centigrade for 10 minutes and finally carbonized at 800° centigrade for 3 to 5 minutes using a hydrocarbon gas consisting of approximately 20 per cent propane and 80 per cent nitrogen. This treatment materially reduces or completely removes sulphur compounds from the nickel electrode to eliminate gas poisoning of the active coating on the emitting cathode of an electron discharge device and forms a uniform pure carbon coating on the electrode to facilitate the dissipation of heat during the operation of the discharge device. This processing of the electrode also avoids the cumulative formation of sulphur and sulphur compounds in the carbon coating and increases the tenacity and hardness of the carbon deposit on the electrode due to the interlinkage of carbon soluble in the surface of the nickel and the interface of carbon adjacent the surface.

In the carbonizing process heretofore described, the gas at no time prior to coming in contact with the nickel electrode in the furnace is heated to a temperature higher than the furnace. In accordance with a modification of the invention, a preheating coil is placed in the gas channel or entering cooling zone of the furnace so that the hydrocarbon gas may be preheated to any desired temperature. In this form of the invention, the preheating of the gas in steps up to 700° centigrade produced a film with a black carbon appearance and when preheated to temperatures between 800° to 1000° centigrade produces a finish having a gun-metal character. However, in carrying out the preheat treatment it is desirable that the gas be heated to a temperature approximately the same or only slightly higher than the carbonizing temperature in the heating zone of the furnace. It is preferred that the temperature of the incoming gas is gradually increased to a maximum where the carbonizing of the electrode is conducted.

While the process has been described with respect to nickel anodes specifically, it is, of course, understood that the procedure may be applied to other metallic electrodes, such as the grid or control electrode or other auxiliary electrodes or elemental parts, such as shields, in discharge devices. Furthermore, the process may be applied to electrodes other than nickel, such as iron, chromium, molybdenum and tungsten. Similarly, the specific furnace herein described is not essential since other types than the insulating tube may be utilized in developing the treatment in accordance with this invention. Finally, many variations in the procedure may be taken advantage of within the general scope of the disclosure without departing from the confines of the invention as defined in the appended claims.

What is claimed is:

1. The method of treating an electrode of an electron discharge device to produce a penetrative homogeneous and highly thermal emissive carbonaceous coating on the electrode surface substantially free from loose particles which comprises, transforming said surface to a spongy condition by heat treatment in several repetitive reducing and oxidizing steps, simultaneously decomposing sulphurous compounds from said electrode, then heating in an atmosphere of 20 per cent propane and 80 per cent nitrogen to produce active carbon particles soluble in the spongy matrix of the electrode, and subsequently bonding a homogeneous carbon layer to said soluble particles to form an adherent matrix having substantially no loose carbon particles and having a relatively high abrasion resistance.

2. The method of desulphurizing and carbonizing an electrode of an electron discharge device which comprises, heating said electrode in a reducing atmosphere from 400 to 800° C., then heating the electrode in an oxidizing atmosphere from 800 to 1000° C., repeating the reducing step at the same temperature, repeating the oxidizing step at approximately 800° C., said repeated reducing and oxidizing treatment etching the electrode surface to a spongy condition, and finally heating said electrode in a carbonizing atmosphere of 20 per cent propane and 80 per cent nitrogen at a temperature of approximately 800° C. for a period not greater than 10 minutes to dissolve carbon particles in the spongy surface as an interfacial substratum and build up a uniform and adherent matrix of carbon having a high abrasion resistance and substantially free from cumulative contamination of sulphur compounds.

3. The method of desulphurizing and carbonizing an electrode of an electron discharge device which comprises, heating said electrode in a reducing atmosphere from 700 to 800° C. for five minutes, then heating the electrode in an oxidizing atmosphere at a temperature of approximately 1000° C. for ten minutes, further heating said electrode in a reducing atmosphere at 700 to 800° C. for five minutes, heating said reduced electrode in an oxidizing atmosphere at 800° C. for ten minutes, said repeated reducing and oxidizing treatment etching the electrode surface to a spongy condition, and finally carbonizing the electrode in an atmosphere of 20 per cent propane and 80 per cent nitrogen at a temperature of 800° C. for three to five minutes to dissolve carbon particles in the spongy surface as an interfacial substratum and build up a uniform and adherent matrix of carbon having a high abrasion resistance and substantially free from cumulative contamination of sulphur compounds.

4. The method of desulphurizing and carbonizing a nickel electrode of an electron discharge device which comprises, heating in a reducing hydrogen atmosphere at a temperature of 800° C. and in an oxidizing atmosphere consisting of an oxygen-nitrogen mixture at a temperature between 800 to 1000° C., repeating the reducing and oxidizing steps at the same temperatures to transform the nickel surface to a spongy condition and remove decomposible sulphur compounds from the nickel, then heating the oxidized nickel in a carbonizing atmosphere of propane and nitrogen at a reaction temperature of 800° C. for producing by thermal decomposition the active hydrocarbon unsaturated compounds of the propylene class, and causing the active carbon particles to penetrate the spongy surface of the nickel to build up a substratum carbon layer soluble with the nickel and homogenize the carbon particles to form an adherent surface on the nickel having a high abrasion resistance and no loose carbon.

5. The method of carbonizing a nickel anode of an electron discharge device which comprises, heating said anode in hydrogen at 700 to 800° C. for five minutes, heating the anode at 1000° C. for ten minutes in an oxidizing atmosphere consisting of 25 per cent oxygen and 75 per cent nitrogen, reducing the oxidized anode in a hydrogen atmosphere by heating to a temperature from 700 to 800° C. for five minutes, subsequently reoxidizing the anode for ten minutes at 800° C. in a mixture of oxygen and nitrogen similar to the first oxidizing step, and finally heating the oxidized anode for three to five minutes at a temperature of 800° C. in a carbonizing atmosphere of 20 per cent propane and 80 per cent nitrogen to reduce the oxide coating thereby presenting the anode surface in a clean spongy condition and forming active carbon particles, which are deposited in the anode surface to a depth of penetration commensurate with the deep etching produced by the repeated reducing and oxidizing steps, the initial particles being soluble in the spongy nickel surface and the balance of particles being bonded to the soluble carbon film to form a homogeneous matrix having a relatively high abrasion resistance and substantially no loose carbon particles.

EMERSON W. KERN.